(12) United States Patent
Yatsu

(10) Patent No.: US 6,738,215 B2
(45) Date of Patent: May 18, 2004

(54) METHOD AND SYSTEM FOR ACCURATE SELF-SERVO WRITING BY USING RELATIVE POSITION BETWEEN HEAD AND WRITING SURFACE

(75) Inventor: Masahide Yatsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 10/102,817

(22) Filed: Mar. 22, 2002

(65) Prior Publication Data

US 2002/0135927 A1 Sep. 26, 2002

(30) Foreign Application Priority Data

Mar. 23, 2001 (JP) ...................................... P2001-084325
Sep. 11, 2001 (JP) ...................................... P2001-275592

(51) Int. Cl.[7] ............................................. G11B 21/02
(52) U.S. Cl. ....................................................... 360/75
(58) Field of Search ......................... 360/75, 58, 73.03, 360/77.08, 77.11, 78.14

(56) References Cited

U.S. PATENT DOCUMENTS

| 5,193,036 A | * | 3/1993 | Green et al. ............. 360/78.14 |
| 5,659,436 A | * | 8/1997 | Yarmchuk et al. ............ 360/75 |
| 6,005,738 A | | 12/1999 | Chainer et al. |
| 6,031,680 A | | 2/2000 | Chainer et al. |
| 6,469,859 B1 | * | 10/2002 | Chainer et al. ................ 360/75 |
| 6,522,494 B1 | * | 2/2003 | Magee ........................ 360/75 |
| 6,603,627 B1 | * | 8/2003 | Chainer et al. ................ 360/75 |
| 6,608,731 B2 | * | 8/2003 | Szita ........................... 360/75 |
| 6,628,471 B1 | * | 9/2003 | Min et al. ..................... 360/75 |
| 6,631,046 B2 | * | 10/2003 | Szita et al. ................... 360/75 |

* cited by examiner

*Primary Examiner*—David Hudspeth
*Assistant Examiner*—Fred F. Tzeng
(74) *Attorney, Agent, or Firm*—Finnegan, Henderson, Farabow, Garrett & Dunner, L.L.P.

(57) ABSTRACT

The magnetic disk apparatus and methods for writing servo data in the magnetic disk drive apparatus detects a relative position between a magnetic head and a writing surface and performs a feedback on the detected relative position for determining the servo data writing position. Based on reference servo patterns that are preliminarily recorded on a portion of at least one surface of the disk, two pairs of head elements, arranged facing respective surfaces of the disk, alternately perform postscript operations of servo patterns while reducing a relative position error between the head and the disk in order to increase writing accuracy of the servo patterns writing operation.

16 Claims, 12 Drawing Sheets

METHOD AND SYSTEM FOR ACCURATE SELF-SERVO WRITING BY USING RELATIVE POSITION BETWEEN HEAD AND WRITING SURFACE

CROSS-REFERENCE TO RELATED APPLICATIONS

This application claims the benefit of priority from Japanese Patent Applications No. 2001-084325, filed on Mar. 23, 2001, and No. 2001-275592, filed Sep. 11, 2001. Each of these applications is hereby incorporated by reference in its entirety.

BACKGROUND OF THE INVENTION

1. Field of the Invention

The invention relates to a magnetic disk drive apparatus having a servo system and methods for writing servo data therein. More particularly, it relates to apparatus and methods for performing self-servo writing based on reference servo data (servo patterns) being preliminarily written in a disk medium.

2. Description of the Related Art

Conventionally, in order to write and read data on and from a target track on a recording surface of a data storage disk medium (hereinafter referred to as a "disk"'), a magnetic disk drive apparatus, such as a hard disk drive apparatus, (hereinafter simply referred to as a "disk drive") includes a servo system for moving and positioning magnetic head elements onto a target track. The servo system includes a servo controller for controlling a drive on a rotary actuator so as to carry the head elements onto a target track by using reference servo data (servo patterns) on a recording surface of a disk. The reference servo patterns are preliminarily provided at servo areas on a recording surface of a disk at a predetermined interval. The servo controller includes a microprocessor (CPU) for mainly controlling a disk drive and a voice coil motor (VCM) driver for driving a rotary actuator under control of the CPU. The reference servo patterns include track address signals and servo burst signals. Track address signals detect track positions and servo burst signals detect a position in a particular track on the recording surface of a disk.

Conventionally, the reference servo patterns are written in servo areas on each recording surface of a disk by using a specialized instrument for a servo track writer. Thus, there is a need for manufacturing a disk drive that includes a process for writing reference servo patterns on both sides of a disk.

The specialized servo track writer instrument includes a head positioning control system (hereinafter referred to as a "positioner") in order to drive a rotary actuator in the disk drive before the servo writing process. In order to write servo patterns onto a disk, the disk drive itself is temporarily fixed in the specialized servo writer instrument so as to synchronize each movement of the positioner and a rotary actuator. Thus, the positioner determines a head position by controlling an amount of movement of the rotary actuator as a preceding process for the servo pattern writing operation. The positioner includes a positioning controller for inputting a target position as an absolute position.

The operation for writing servo patterns is performed through a head element of the disk drive. When a target position is inputted, the positioning controller determines an error between a present position of the positioner and a target position. Based on a remaining distance of the target position, the positioning controller calculates an operation amount C(z) for driving a motor in the positioner by a rotation angle M(s). Thus, the positioner is moved by an amount P(s).

The positioner further includes an encoder for measuring a feedback moving amount E(s) of a target position to the positioning controller as an absolute position of the positioner. During the feedback operation, the moving amount E(s) may be affected by noises. The positioner further includes a pushpin that is coupled to a rotary actuator so as to move the actuator by an amount R(s) in accordance with the movement amount P(s). Based on the rotary actuator movement amount R(s), a head slider moves by an amount H(s). Thus, an actual position for writing the servo pattern can be determined. After the servo pattern writing position is determined, there is a possibility for the servo pattern writing position to be influenced by vibrations of a spindle motor (SPM) of the disk drive. The vibrations of the SPM produces an error for the servo pattern writing position.

Further, the servo track writer instrument includes a clock head for writing a clock pattern during a rotation of the disk by the SPM. The servo track writer instrument determines a specific time for writing (writing time) servo pattern along a rotational direction of a disk by reading the clock pattern through the clock head. The servo track writer instrument executes the servo pattern writing operation by using the writing head of the magnetic head element based on the clock timing detected by the clock head. Thus, when the head positioning operation is completed, the servo track writer instrument instructs the writing head to write servo patterns in a target track.

When the servo pattern writing operation for one track circle has completed, the positioner moves to a next position of another target track circle. By repeating the same servo pattern writing operations on succeeding positions on a target track circle, the servo patterns are written on one surface of the disk. Since a disk has two surfaces, the same operation for writing the servo patterns is performed on a second surface of the disk.

In order to accurately write the servo patterns, as explained above, measurements are determined for a relative position between a head position and a disk surface. However, even if the position of the positioner is controlled with high accuracy, it does not mean the relative position error between the head position and the disk surface is reduced since the disk is a rotating body connected to a spindle motor (SPM). Thus, in order to improve the accuracy of the servo pattern writing, there is a need to accurately follow the head position in responding to position variations due to the SPM.

Since the conventional operation for writing servo patterns on a disk is performed by removing a top cover of a disk drive, i.e., both disk surfaces and magnetic head elements are exposed, the servo pattern writing operation must be performed in a clean room environment.

A recent increase of recording density in a disk surface, i.e., a higher track pitch, increases the number of tracks for writing the servo patterns. As a result, an operation time for writing the servo patterns per one disk drive is also increased. So far, it takes more than twenty minutes for writing the servo patterns per one disk drive including a disk that has formed thereon more than ten thousand tracks on one surface. Thus, the servo writer instrument is occupied by one disk drive until completing the servo pattern writing operation on both surfaces of the disk. Therefore, an increase of the track density is expected. Under these circumstances, there is a need to install an increased number of servo writer instruments in an enlarged clean room environment.

When the servo pattern writing operation on both surfaces of a disk have completed, the disk drive is removed from the servo writer instrument, the disk drive is covered with a top cover and is brought to a functional verification process for the disk drive by attaching a circuit board module.

However, the conventional apparatus and methods for writing servo patterns using a specialized servo track writer instrument have serious deficiencies, in particular manufacturing costs and a writing accuracy of the servo patterns.

As explained above, a conventional servo track writer instrument drives a rotary actuator based on movement of the positioner. During driving of the rotary actuator, a relative error between a present position of the positioner and a feedback of a target position is supplied to the position controller as a control amount. As a result, when the positioner reaches a position of a target track, it is assumed that a writing head element on the rotary actuator also reached the position of the target track. Then the position controller calculates an operation amount in order to reduce the relative error between the present position of the positioner and the feedback of the target position. However, the writer instrument essentially needs to seek the relative position between the head element and the disk in order to write the servo patterns with sufficient accuracy. Thus, even if the position of the positioner is controlled with sufficient accuracy, it does not necessarily reduce the error of the relative position between the head element and the disk. Especially since the disk, a rotating device, attached to the SPM, causes position changes. Thus, in order to increase the accuracy for writing the servo patterns, it is expected to correctly follow the head position against the changes of the disk position due to the SPM.

Furthermore, in order to increase the storage density of a disk, a higher track density is required. Thus, the numbers of tracks for writing the servo patterns are also increased. As a result, the servo pattern writing time for a disk drive is also increased. More than one thousand tracks are formed on both surfaces of a disk and it usually takes more than twenty minutes for completing the writing of servo patterns to one whole surface side of a disk. Thus, an increase of the track density is expected.

During the writing of the servo patterns, the servo writer instrument is occupied by one disk drive until completing the writing of the servo patterns on one whole surface side of a disk. Consequently, accompanying the above situation, it is required to increase the production number of the servo writer instrument. Furthermore, the conventional servo writer instrument must be used in a clean room. A site expansion for the clean room environment is also required in connection with the increase of the servo writer instruments, thus, increasing the production number of the disk drive resulting in serious problems. Furthermore, the conventional method for using a servo pattern writer instrument includes the problem of an increase in manufacture cost.

To overcome the above and other disadvantages of the prior art, apparatus and methods consistent with the present invention performs a self-servo writing operation without using a special servo writer in order to increase the accuracy of the write positions and timing of servo patterns and to reduce disk manufacturing costs.

SUMMARY OF THE INVENTION

The present invention is intended to overcome the above-mention disadvantages for performing a self-servo writing operations. Embodiments consistent with the present invention may include a magnetic disk drive apparatus that can determine an appropriate servo pattern writing position by measuring a relative position error between a head and a disk surface facing the head.

An embodiment consistent with the present invention relates to a magnetic disk drive apparatus, comprise a disk medium having a disk medium having a first and a second surface, each including a plurality of recording tracks having a certain track width, and at least one of the first and second surfaces of the disk medium including a plurality of preliminarily recorded reference servo data; a first pair of head elements facing close to the first surface of the disk medium for writing a first servo data and/or reading the reference servo data; a second pair of head elements being located symmetrically to the first head element facing close to the second surface of the disk medium for writing a second servo data and/or reading the reference servo data; a head positioner for alternately determining a first and second head position for data writing on the respective surfaces by calculating a first relative position between the second head element and the second surface, based on the reference servo data or the second servo data read by the second head element, and by calculating a second relative position between the first head element and the first surface based on the reference servo data or the first servo data read by the first head element; a head mover for alternately carrying the first or second head element to the data writing position on respective surfaces of the disk medium determined by the head positioner; and a servo data writing controller for controlling the respective servo data writing on the respective data writing positions on the respective surfaces of the disk medium by the respective head element.

Another embodiment consistent with the present invention relates to a magnetic disk drive apparatus, comprising a disk medium including a first and a second data recording surface, at least one of the surfaces of the disk medium having a reference data area in which reference servo data for determining a writing position along a radius direction and reference clock patterns for determining a writing time along a rotational direction are preliminarily recorded; a first and a second pair of magnetic head elements for performing data read/write operations on respective surfaces of the disk medium; and a controller for controlling servo data writing operations in a predetermined area of the respective surfaces by using the reference servo data and the reference clock patterns read by the magnetic head elements facing the respective surfaces during a servo writing operation; wherein the controller includes a positioning controller for determining a writing position of the servo data along a radius direction of the disk medium by using the reference servo data, and a writing controller for determining a writing time of the servo data along a rotational direction of the disk medium by using the reference clock patterns.

A further embodiment consistent with the present invention relates to a method for writing servo data in a magnetic disk drive apparatus including a disk medium having a first and a second surface, each having a plurality of recording tracks and a plurality of preliminarily recorded reference servo data, wherein each of the recording tracks have a track width, a first pair of head elements facing close to the first surface of the disk medium for writing servo data and reading the reference servo data, and a second pair of head elements being located symmetrically to the first head element of the disk medium so as to closely face to the second surface of the disk medium for writing servo data and reading the reference servo data, the method comprising writing a first servo data on the first surface of the disk medium with the first head element; reading the reference servo data or the first written servo data with the first head element; writing a second servo data on the second surface of the disk medium with the second head element; reading the reference servo data or the second written servo data with the second head element; calculating a first relative position between the second head element and the second surface of the disk medium based on the reference servo data or the second servo data read by the second head element; determining the first head position for data writing on the first surface of the disk medium; calculating a second relative position between the first head element and the first surface of the disk medium based on the reference servo data or the first servo data read by the first head element; determining the second head position for data writing on the second surface; and alternately carrying the first or second head element to the determined data writing position on the respective surfaces of the disk medium.

Yet another embodiment consistent with the present invention relates to a method for writing servo data in a magnetic disk drive apparatus including a disk medium having a first and a second data recording surface, each surface having a reference data area in which reference servo data for determining a writing position along a radius direction and reference clock patterns for determining a writing time along a rotational direction are preliminarily recorded and a first and a second pair of magnetic head elements for performing data read/write operations on the respective surfaces of the disk medium; the method comprising reading the reference servo data and the reference clock patterns with a first read head facing the first surface of the disk medium; determining a writing position on the second surface of the disk medium by using the reference servo data read by the first read head; determining a writing time of a second write head by using the reference clock patterns read by the first read head; and writing the reference servo data and the reference clock patterns on the second surface of the disk medium with the second write head.

BRIEF DESCRIPTION OF THE DRAWINGS

The accompanying drawings, which are incorporated in and constitute part of this specification, illustrate various embodiments and/or features of the invention and together with the description, serve to explain the invention. Wherever possible, the same reference numbers will be used throughout the drawings to the same or the like parts. In the drawings.

DETAILED DESCRIPTION

Figure 1:
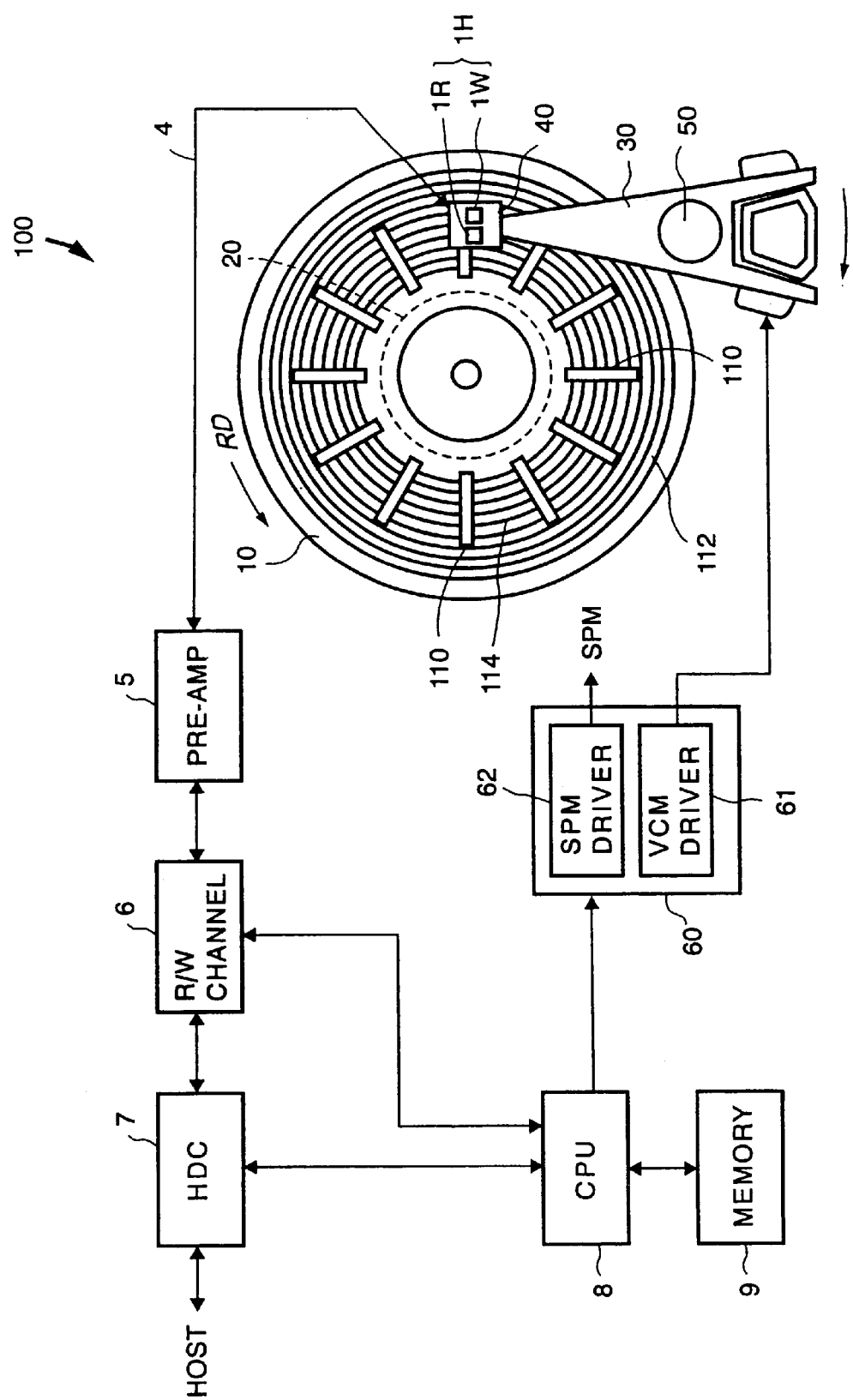
FIG. 1 is a block diagram of an exemplary configuration for a self-servo writing system in which methods and apparatus consistent with the present invention may be implemented.

Reference will now be made in detail to the exemplary embodiments of the invention, examples of which are illustrated in the accompanying drawings. FIG. 1 is a block diagram of an exemplary configuration for a servo system in a magnetic disk drive apparatus 100 in accordance with methods and apparatus consistent with the invention. The magnetic disk drive apparatus 100 includes a magnetic recording disk medium 10 of which surfaces are coated with magnetic material, a spindle motor (SPM) 20 for rotating the disk 10, and a rotary actuator 30 for driving a head slider 40 along a radius direction of the disk 10. The actuator 30 includes a suspension arm for holding the head slider 40 and a voice coil motor (VCM) 50 for rotating the head slider 40. The head slider 40 supports a first pair of magnetic head elements (first head element) 1H, i.e., a first write head 1W for writing data into the disk 10 and a first read head 1R for reading data from the disk 10.

Figure 2:
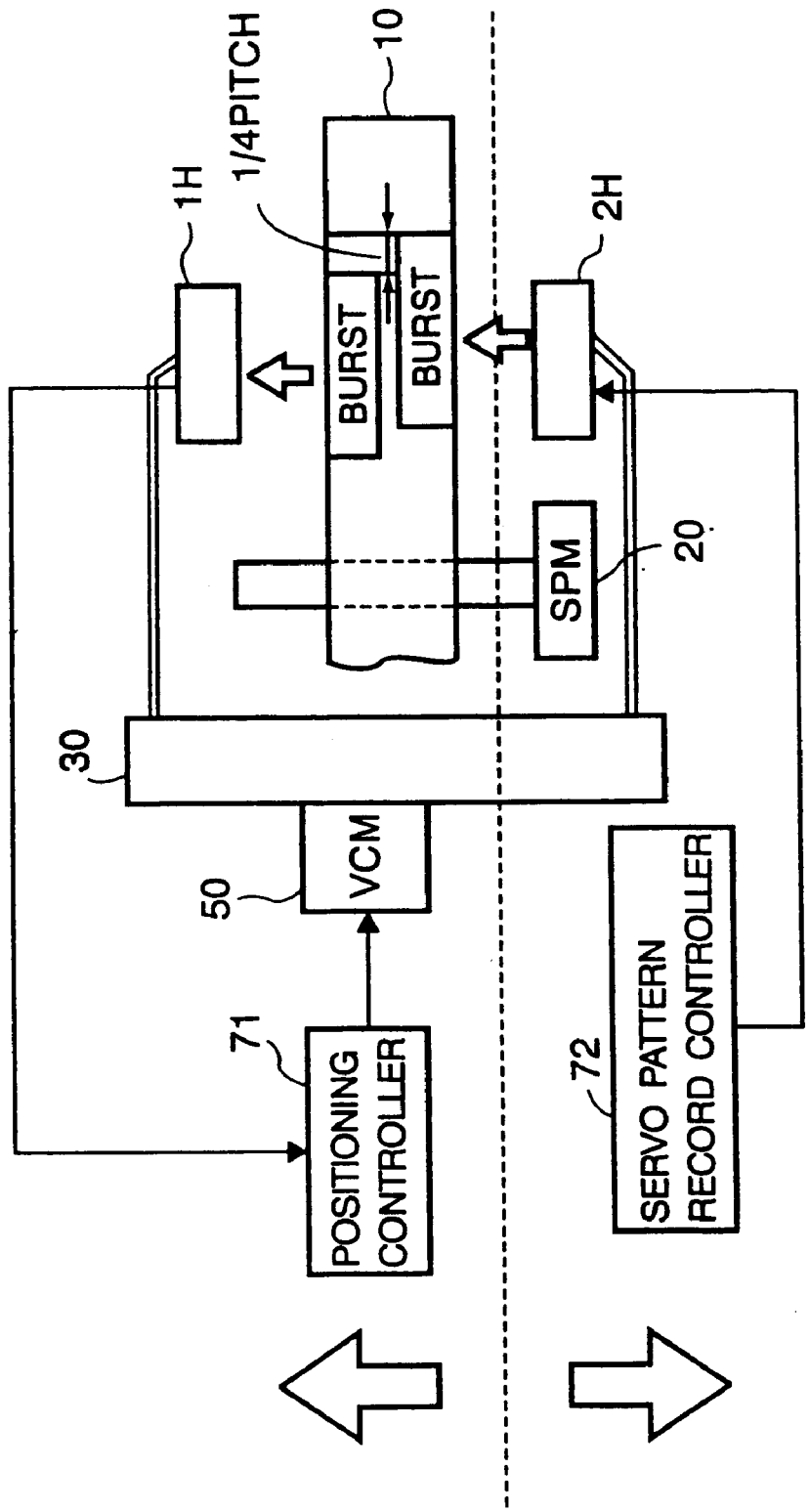
FIG. 2 is a block diagram for explaining aspects of the self-servo writing system consistent with the present invention.

The disk 10, used for a small sized magnetic disk apparatus employing a sector servo system, such as Hard Disk Drive (HDD) of 2.5 inches, includes a multiplicity of concentric circular tracks on both data recording surfaces of the disk 10. Thus, as shown in FIG. 2, a practical disk drive apparatus includes a second pair of head elements (second head element) 2H, i.e., a second write head 2W and a second read head 2R, facing a bottom surface of the disk 10 for writing and reading data.

During operation of the disk drive apparatus 100, the SPM 20 rotates the disk 10 at a high-speed counter-clockwise. The first pair of head elements 1H (1W, 1R) are floating close to a surface of the rotating disk. For implementing the disk drive apparatus 100 consistent with the invention, in each pair of the head elements 1H and 2H, the write heads (1W, 2W) and read heads (1R, 2R) are arranged in parallel along a radius direction of the disk 10 on the slider 40. The slider 40 moves closely on a surface of the disk 10 along generally a radius direction of the disk by rotation of the rotary actuator 30. The rotary actuator 30 moves each pair of head elements and determines a head position on a target track (TP) of the disks 10 under a servo control of a microprocessor (CPU).

The disk drive apparatus 100 further includes a pre-amplifier 5, a read/write (R/W) channel 6, a disk controller (HDC) 7, a CPU 8, a memory 9, and a motor driver 60. The pre-amplifier 5 amplifies reproduced signals read by the first read head 1R from the disk 10. Further, pre-amplifier 5 includes a write amplifier for converting write data to write currents. Read/write channel 6 decodes data from the reproduced signals by performing Partial Response Maxiumum Likelihood (PRML) signal processing. R/W channel 6 includes a servo patterns reproducing circuit. Thus, the decoded data from the reproduced signals includes servo patterns. Further R/W channel 6 executes, for example, Run Length Limited (RLL) coding process for the write data. HDC 12 executes transfer controls of read and write data as an interface unit between the disk drive apparatus 100 and a host system, such as a personal computer or other digital devices. The motor driver 60 includes a VCM driver 61 for driving the VCM 50 and a SPM driver 62 for driving SPM 20.

The CPU 8 is a main controller of the disk drive apparatus 100. Further, the CPU 8 includes a servo controller for realizing a self-servo writing system of an embodiment consistent with the present invention. Thus, the servo controller includes the CPU 8, servo patterns reproducing circuit in R/W channel 6 and VCM driver 61. The servo controller performs positioning controls of the magnetic head elements and self-servo patterns write operation by reproducing reference servo patterns (SP) and reference clock patterns (CP) that are preliminarily recorded on the disk 10. CPU 8 controls input value, i.e., a control voltage of the VCM driver 61 for driving rotary actuator 30 through VCM 50. The memory 9 includes a RAM, ROM and flush EEPROM for storing a control program for the self-servo writing operation and other various control data.

Each recording surface of the disk 10 includes a predetermined number of reference servo areas 110 and a multiplicity of tracks 112. In each of the servo areas 110, servo patterns are recorded at a predetermined distance in a circumference direction of the disk during a preliminary servo writing process by using a special servo writer instrument. By using servo areas 110 as references, the multiplicity of tracks 112 are formed in concentric circles. A plurality of reference servo areas 112 and a plurality of data sectors 114 are alternately provided at a certain distance. Thus, as a preliminary process, reference servo patterns (SP) and reference clock patterns (CP) are preliminarily recorded in servo areas on at least one surface of the disk 10. The reference servo patterns (SP) include track address codes for detecting each of the track positions and servo burst signals, i.e., position error signals for detecting a position in each of the tracks. The clock patterns (CP) are recorded between the reference servo patterns (SP) for determining writing times in a rotational direction (RD) of the disk 10.

With reference to FIG. 2, aspects of a postscript of servo patterns implemented in disk drive apparatus consistent with the invention will be explained. The term "postscript" as used herein refers to an operation of writing a servo pattern using the preliminarily recorded servo patterns. In this embodiment, the servo controller controls additional write servo patterns at outer tracks of the disk 10 by reading reference servo patterns (SP) recorded at inner tracks of the disk 10. As mentioned above, the magnetic disk apparatus 100 includes two pair of magnetic head elements, 1H and 2H, that are arranged to overlap up and down on both surfaces of the disk 10. The first head element 1H includes the write head 1W and the read head 1R facing an upper surface of the disk 10. The second head element 2H includes the write head 2W and the read head 2R facing a bottom surface of the disk 10.

Since reference servo patterns are preliminarily embedded at inner tracks of the disk 10, first read head 1R in the first head element 1H reads the reference servo patterns. A position controller 71 detects an appropriate position of read head 1R relative to tracks on the upper surface of disk 10. Upon detection of the appropriate position of the read head 1R, the position controller 71 moves and positions the write head 2W, for example, in ¼ pitch part perimeter of the disk 10. In accordance with instructions from a write controller in a servo controller 72, the write head 2W writes the servo patterns at a target position.

By preliminarily recording the servo area 110 over the corresponding several ten to hundreds tracks on the upper surface of disk, it becomes possible to additionally write the servo patterns over the substantially same number of tracks on the bottom surface of the disk 10. When the servo patterns are written on both surfaces over the substantially same number of tracks, the servo write process operation takes turns alternately writing data on both surfaces of the disk 10. Thus, in this embodiment, it is necessary to preliminarily write reference servo patterns 110 at least on one surface of disk 10. However, the preliminary writing process of the servo patterns can be finished in only several tens of seconds, since it is written only over several ten to hundreds of tracks. Moreover, it is also possible to preliminarily write the reference servo patterns 110 on both surfaces of the disk 10.

During the operation of writing servo patterns, there is a need to unite clock timing in a bit unit form between the preliminary servo patterns and the postscript servo patterns. It is possible to set up the process so that the writing time is acquired from the reference burst signals. The writing time will be explained later.

Figure 3:
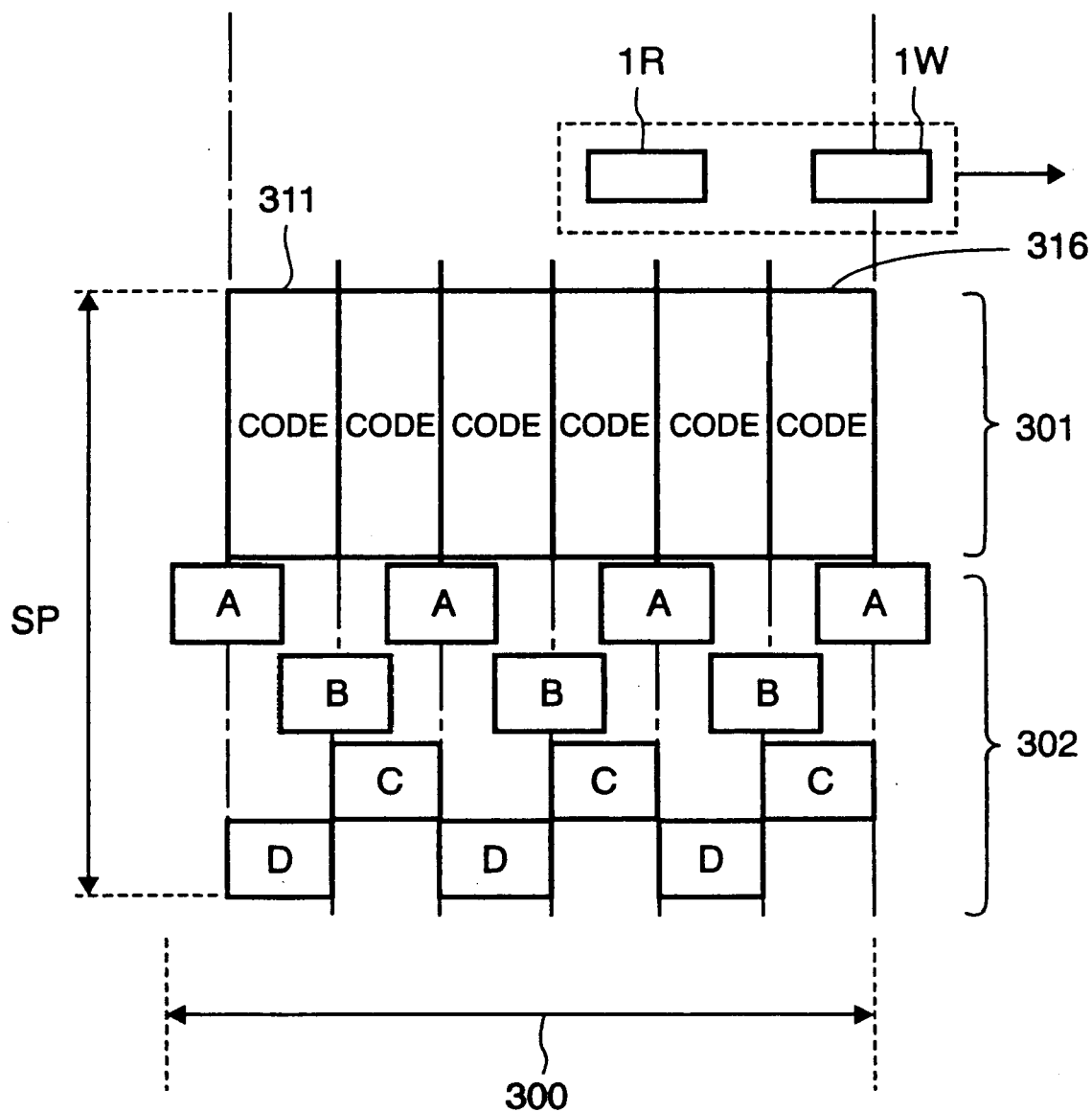
FIG. 3 is a diagram of an exemplary relationship between read/write head elements and preliminarily embedded reference servo data used in methods and apparatus consistent with the present invention.
Figure 4:
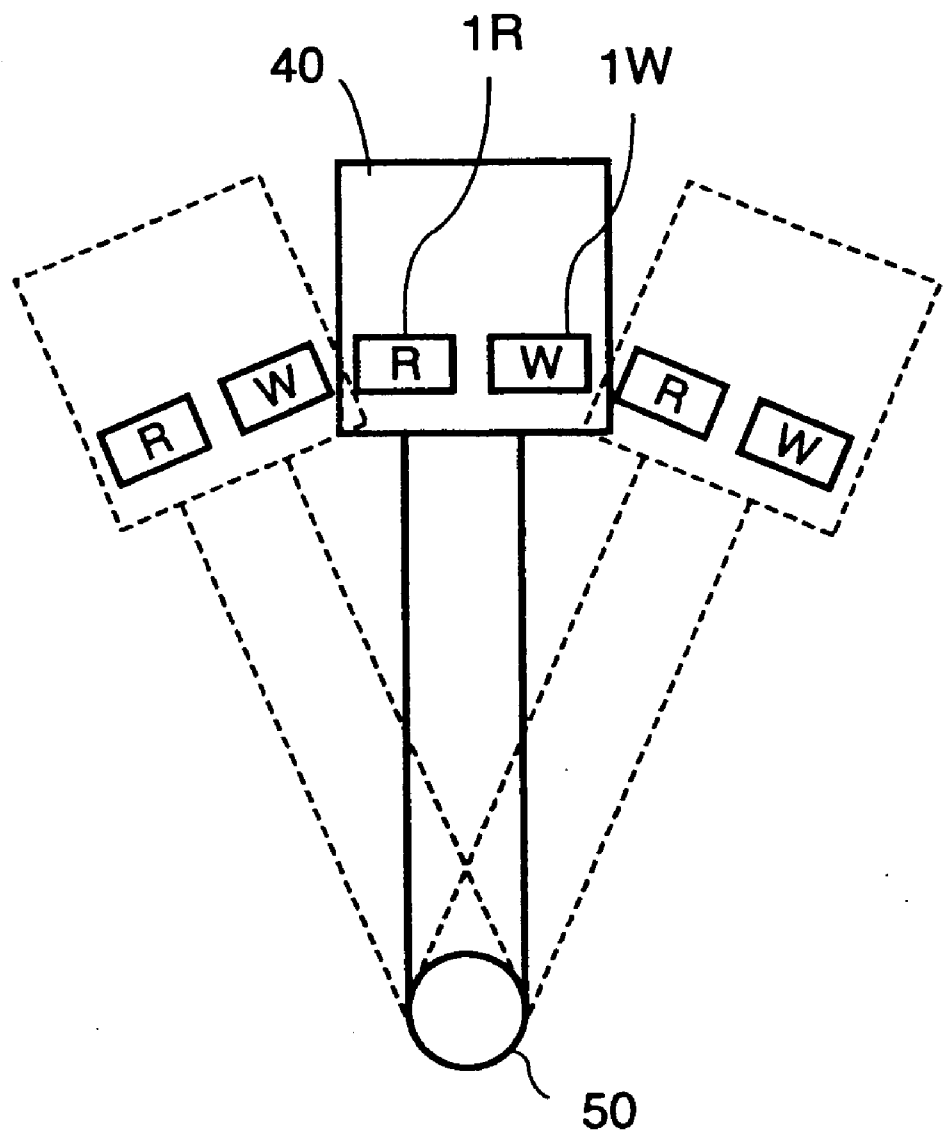
FIG. 4 is a diagram of an exemplary relationship between a read head and a write head used in methods and apparatus consistent with the present invention.

In the postscript operation of the servo writing patterns, a high accuracy of the writing is determined by considering a positional relationship between a write head and a read head in the same head element. In FIGS. 3 and 4, the positional relation of the read/write heads, for implementing an embodiment consistent with the invention, is explained. As described above, the servo patterns read operation and postscript operation are performed by alternately changing the head pairs. Here, in order to clarify the position relationship of both head elements, for convenience, the write head and read head in the same head pair is shown.

FIG. 3 illustrates a preliminarily embedded reference servo patterns 300 comprised of address codes 301 and burst patterns 302. The address code 301 includes a plurality of codes corresponding to each of the tracks. Each code has information for indicating a position and a number of a particular track. The burst pattern 302 is comprised of a plurality of burst signals, A–D, positioning on or in a middle portion of each track. The positioning controller identifies a particular track based on each code read by the first read head 1R and then calculates an appropriate position in a particular track based on an output ratio of each burst signal. In FIG. 3, the reference servo patterns 300 are written by successively moving the first head element 1H in a ½ pitch right direction under the following order.

→A→move→code→D→move→B→move→code→C
→move→A→

If the above servo patterns postscript operation is applied to a conventional magnetic disk apparatus in which a read head and a write head are arranged in an overlapped position along a radius direction, a problem of accuracy occurs regarding the position of the postscript of servo patterns. Thus, when a burst signal is additionally written over the right end track of the reference servo patterns 300, by using the vertically arranged pair of head elements, the write head and read head are both positioned at the far right of the reference servo patterns. The read head can only detect partial parts of an address code and burst signal on the track, resulting in a reduced signal and error in the signal output and an increased amount of position compensation. Thus, it becomes impossible to detect an exact track position or track number. Further, it becomes impossible to detect a position on a track based on a signal output ratio. By arranging a giant magneto-resistive head (GMR) in the disk drive apparatus, the relative position of the write head and read head, arranged on the slider, can be as close as possible which reduces the amount of position compensation. Thus, the conventional head elements are generally disposed in a direction of the circumference of disk 10.

In FIGS. 1 and 4, the first head element, first write head 1W and first read head 1R, are arranged in parallel with a predetermined distance along a radius direction of the disk 10 in order to avoid the above disadvantages. In this embodiment consistent with the invention, the GMR write head 1W and read head 1R are arranged in order to separate at least more than one (1) track pitch. Accordingly, if the postscript of a burst signal arranged over a right end track 316 is performed, as shown in FIG. 3, the first read head 1R can read reference servo patterns 300 with sufficient accuracy. Thus, the first write head 1W can perform a postscript operation of the servo patterns at an appropriate position. As a result, the embodiment consistent with the invention can improve the accuracy of the servo patterns postscript, since all four burst patterns, A to D, are fully used for positioning the head elements.

Figures 5A, 5B:
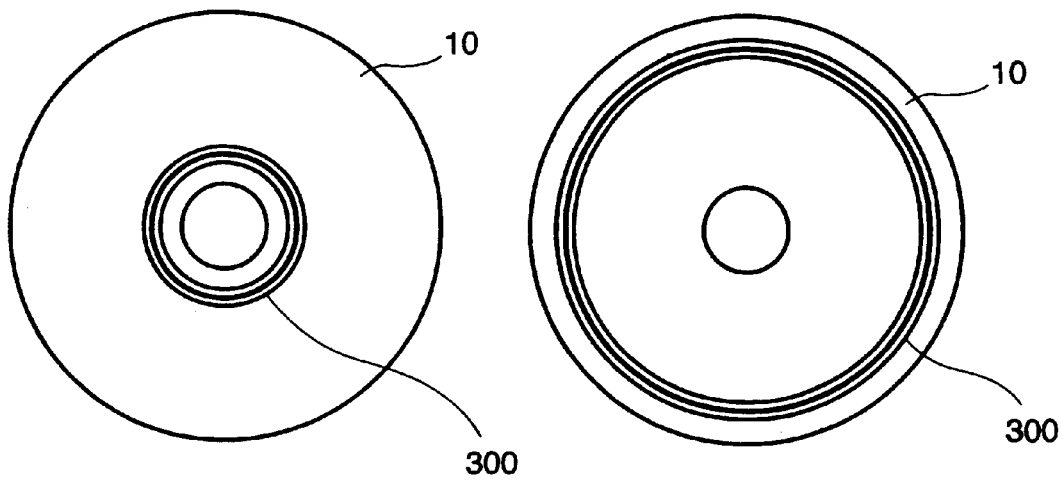
FIGS. 5A and 5B illustrate write positions on a disk in accordance with methods and apparatus consistent with the present invention.

Moreover, in the conventional disk apparatus, the reference servo patterns 300 can be recorded only at middle circumferences on the disk, because the magnetic head elements are arranged in a direction along a rotary actuator that locates the same track when both heads are located at middle circumferences on the disk. On the contrary, according to a head composition in the embodiment consistent with the invention, it becomes possible to record the reference servo patterns 300 at an inner circumference on the disk 10 or an outer circumference on disk 10, as shown in FIGS. 5A and 5B.

Figure 6:
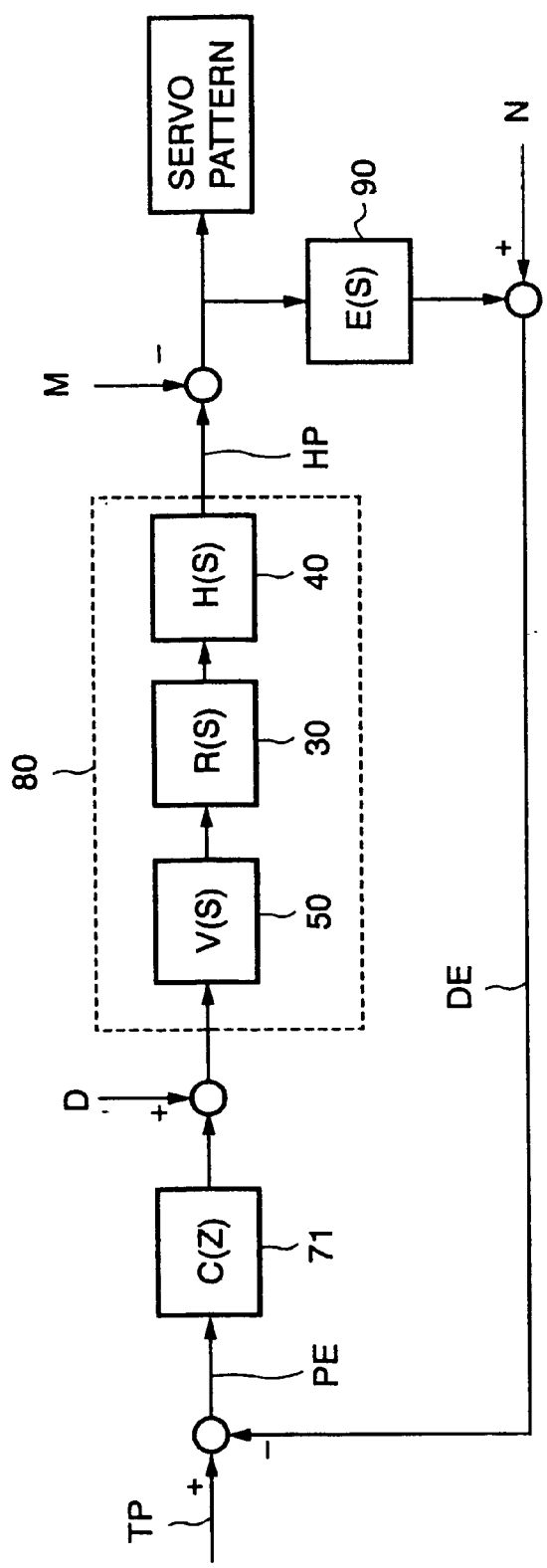
FIG. 6 is a block diagram of an exemplary configuration of a positioner for determining write positions of servo data in a disk drive apparatus consistent with the present invention.

With reference to FIG. 6, alternate positioning operations for the servo patterns postscript according to each pair of head elements is explained. FIG. 6 illustrates a servo patterns postscript positioning mechanism, for example, a first write head 1W in the disk drive apparatus 100.

As explained above, an appropriate relative position relationship between the first write head 1W and the disk 10 is sought, based on reference servo patterns 300 read from an upper surface of the disk 10. The CPU 8 searches for an error target position (offset position) of the first write head 1W on the upper surface of disk 10, the relative position and calculates the operational amount for moving and positioning the first write head 1W to a target position (TP). The target position (TP), as an offset position of the first write head 1W, is inputted into the positioning controller 71. The positioning controller 71 searches the position error (relative position) of the first write head 1W and the disk 10, then calculates an amount C(z) of the operations according to the remaining distance to the target position (TP). The calculated operation amount C(z) is supplied to an actuator unit 80 for moving the magnetic head elements. The actuator unit 80 includes the VCM 50, the rotary actuator 30 and the slider 40.

The operation amount C(z) is converted to drive currents and supplied to the VCM 50. Thus, power disturbances may result from the operation amount C(z). In response to the operation amount C(z), VCM 50 rotates by the rotation amount (angle) V(s). By the rotation angle V(s) of VCM 50, the rotary actuator 30 moves the slider 40 by a movement amount R(s) and the slider 40 moves by a movement amount H (s). Since the first write head 1W is attached to the slider 40, a write-in position of the servo patterns can be determined. The determined write-in position of the servo patterns is detected by a position detector 90 as a detection amount E(s). The detection amount E(s) is supplied to the position controller 71 as a feedback.

As illustrated in FIG. 6, various disturbances, such as acceleration disturbances (D), e.g., power disturbances, generated by rotations and vibrations of the disk 10, SMP vibration servo patterns (M), or observation noises (N) may be applied to decoded signals, the circuit, or to the actual head positioning system of the magnetic disk apparatus 100. As a result, the relative position relationship between the disk 10 and the position of the first write head 1W is varied. However, in the embodiment consistent with the invention, the position detector 90 feeds back the detection amount E(s) to the position controller 71. Thus, the improvement in positioning accuracy is determined. The detection amount E(s) includes SMP vibration servo patterns (M) which effects an error generating factor of the first write head 1W position. The positioning controller 71 is preliminarily designed to sustain or reduce such disturbances in the magnetic disk apparatus.

Figure 7:
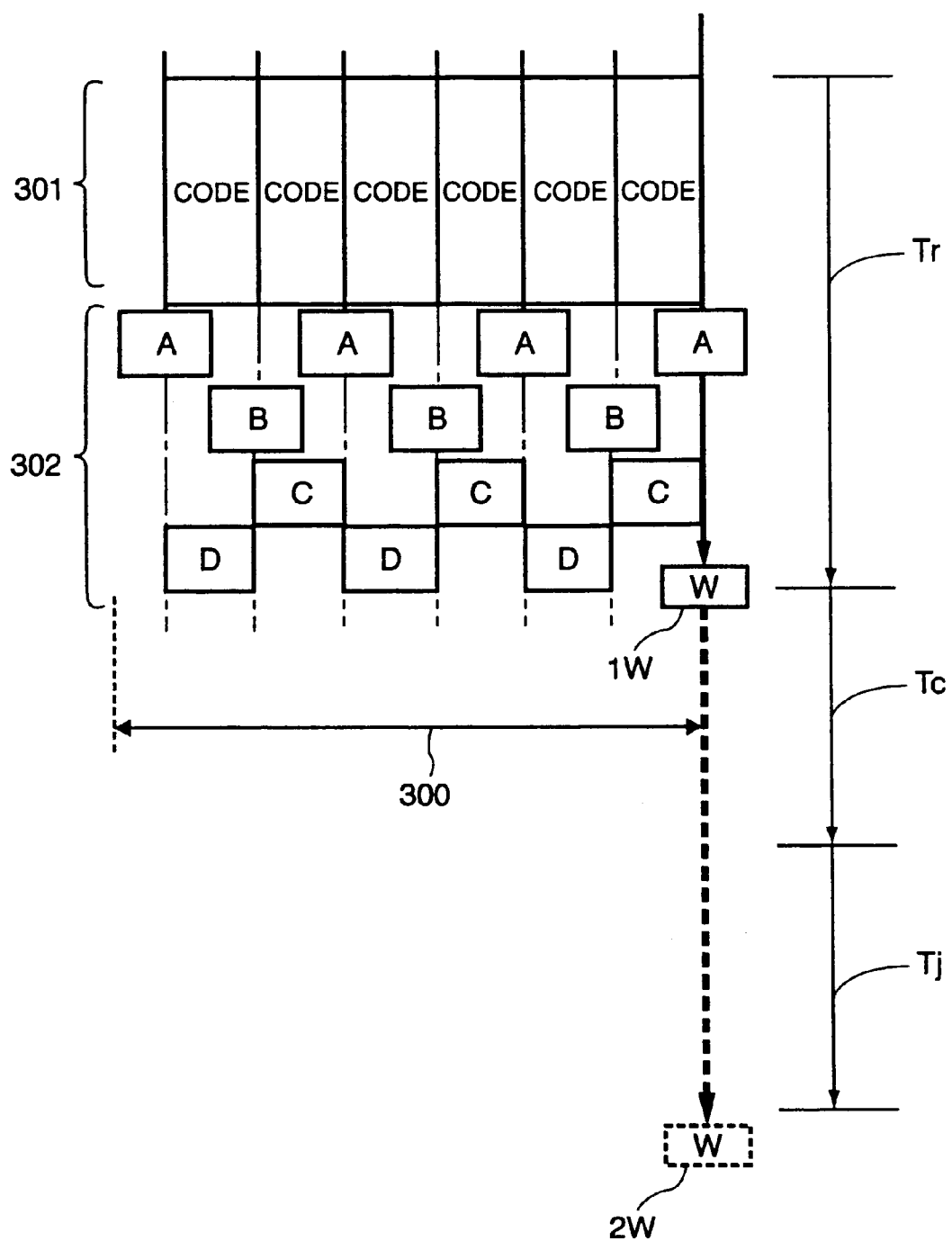
FIG. 7 is a diagram for explaining time delay of a writing judgment in magnetic disk apparatus consistent with the present invention.

FIG. 7 shows the processing times required for the postscript operations of the servo patterns in this embodiment consistent with the invention. When all operations by the first head element 1H are completed, a servo patterns write-in operation by the second head element 2H begins. Thus, as shown in FIG. 7, the operations by the first head element 1H, includes a servo signal read time (Tr), position error calculation time (Tc), and servo patterns write-in judgment time (Tj). Consequently, a time phase difference arises between the servo patterns used for positioning by the first head element 1H and the write-in servo patterns by the second head element 2H, due to the position error calculation time (Tc) and the servo patterns write-in judgment time (Tj). The time phase difference is approximately 15–20 microseconds. However, even if the phase difference arises in the servo patterns corresponding to each of the head elements, problems do not result in the head elements since each of the surfaces facing the first head element 1H and the second head element 2H are respectively independent from each other. In essence, a regular interval for the servo sector intervals on each surface of the disk is sustained in each pair of head elements.

On the contrary, if the head positioning operations and the servo patterns writing operation are performed by using the first head element 1H only, it becomes difficult to keep the constant servo sector intervals since the phase difference will occur on the same surface of the disk. In order to keep constant servo sector intervals by using the first head element 1H only, after passing through the processing time required for the positioning operation by the first read head 1R, write-in dummy servo patterns are needed corresponding to the phase difference by the first write head 1W. Further, after writing the dummy servo patterns, there is a need to carry out a positioning operation by the first read head 1R. Then, actual servo patterns are written by the first write head 1W. Such operations may be very complicated since the operation time can be excessive. Moreover, since such dummy servo patterns are not required for the magnetic disk apparatus, the dummy servo patterns are be eliminated after completing the servo patterns writing operations.

Figure 8:
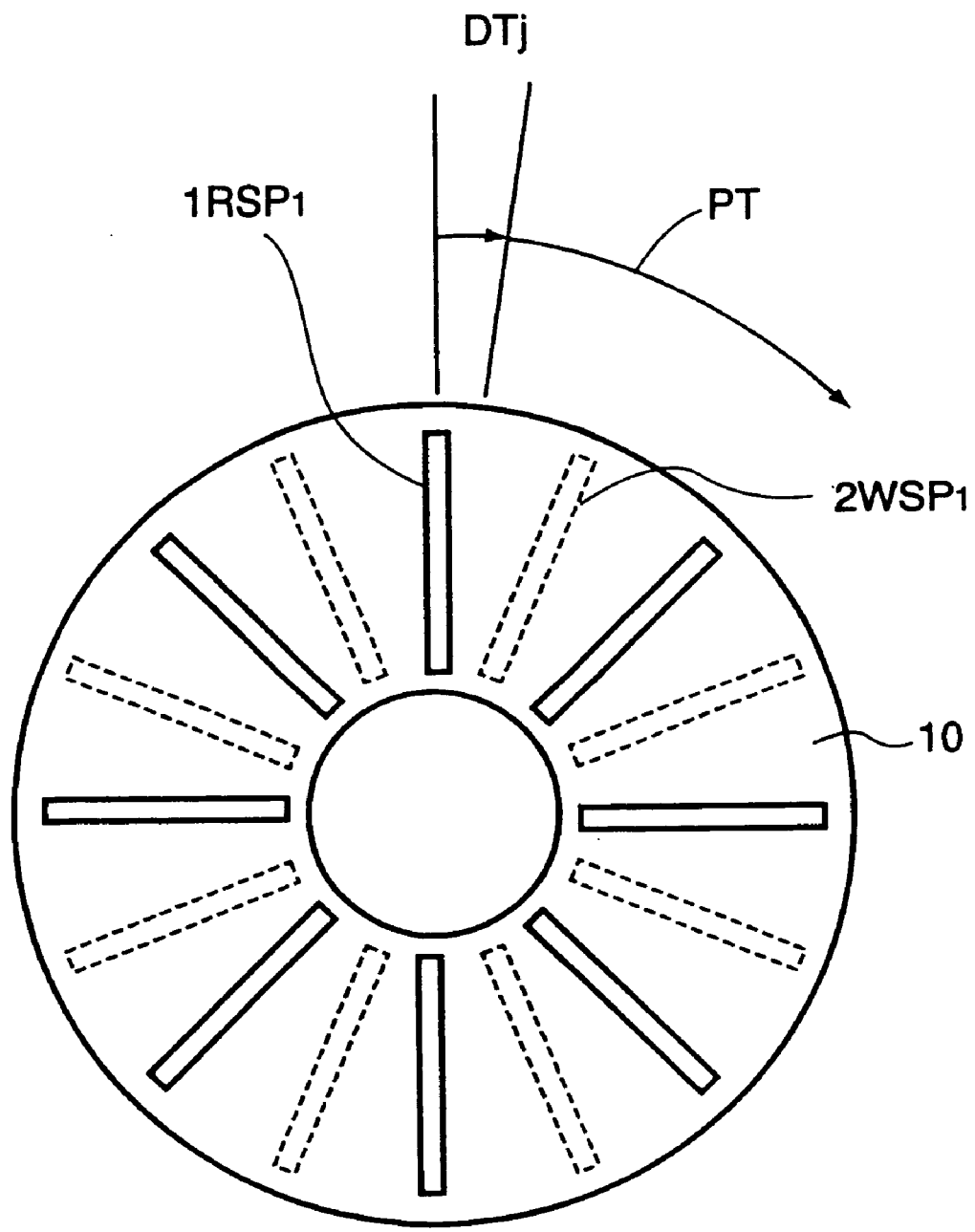
FIG. 8 is a diagram showing servo pattern writing positions by both pair of head elements in magnetic disk apparatus consistent with the present invention.

According to the embodiment consistent with the invention, as illustrated in FIG. 8, the first head element 1H and the second head element 2H alternately performs servo pattern read operations and servo pattern writing operations. Thus, the transcript of the servo patterns is independently performed on each surface side of the disk. For example, after the first read head 1R completes the reading operation of the servo patterns (1RSP₁) at a reference position on the upper surface, the second write head 2W alternately performs the servo patterns writing operation on the bottom surface of the disk 10 during servo pattern write operation. The reading operaton of the first read head 1R on the surface and the writing operation of the second write head 2W has a capable time (PT) which begins after a judgment delay time (DTj).

First, a head positioning of the first read head 1R is performed based on reference servo patterns (1RSP₁) written on the upper surface of the disk 10, and the servo pattern postscript operation by the second write head 2W is performed on the bottom surface of the disk 10. Next, the head positioning is performed by the second read head 2R based on the servo patterns already written on the bottom surface of the disk 10, and the servo pattern postscript operation of by the first write head 1W is performed on the upper surface of the disk 10. Thus, both head elements alternately perform reading and writing operations. Consequently, even if the time phase differences occur between the servo patterns used for head positioning and the recorded servo patterns, a problem does not result in the servo patterns. Moreover, excessive operations, such as generating dummy servo patterns, is not needed. Basically, the servo patterns writing operation on an opposite surface of the disk 10 may be carried out at any time as long as the judgment time is delayed (DTj). FIG. 8 illustrates the servo pattern writing operations performed alternately by the first write head 1W. The first write head 1W is preliminarily shifted in a position of ½ pitch interval.

Figure 9:
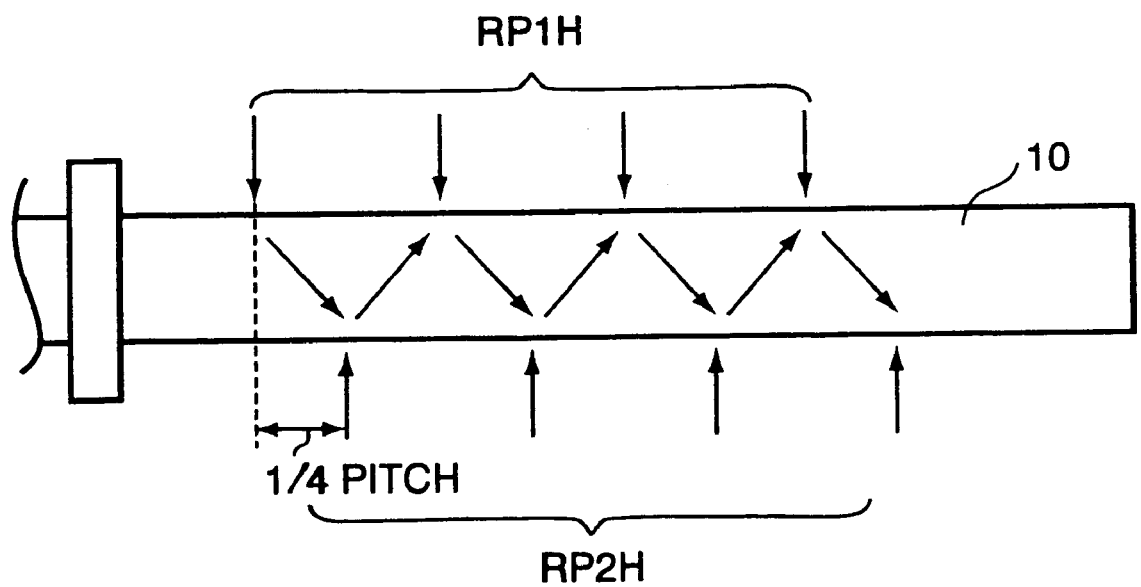
FIG. 9 is a section view of the disk for explaining alternate postscript write operations in apparatus consistent with the present invention.

FIG. 9 illustrates the alternate postscript operation viewed from a section of the disk 10. Here, in case of a postscript operation by the write head elements, 1W and 2W, each write head is shifted in a ¼ pitch interval with each other along a radius direction so as to recognize the postscript of ½ pitch servo patterns on both surfaces of the disk 10. In FIG. 9, RP1H indicates a reference position of the first head element 1H and RP2H shows a reference position of the second head element 2H.

Figure 10:
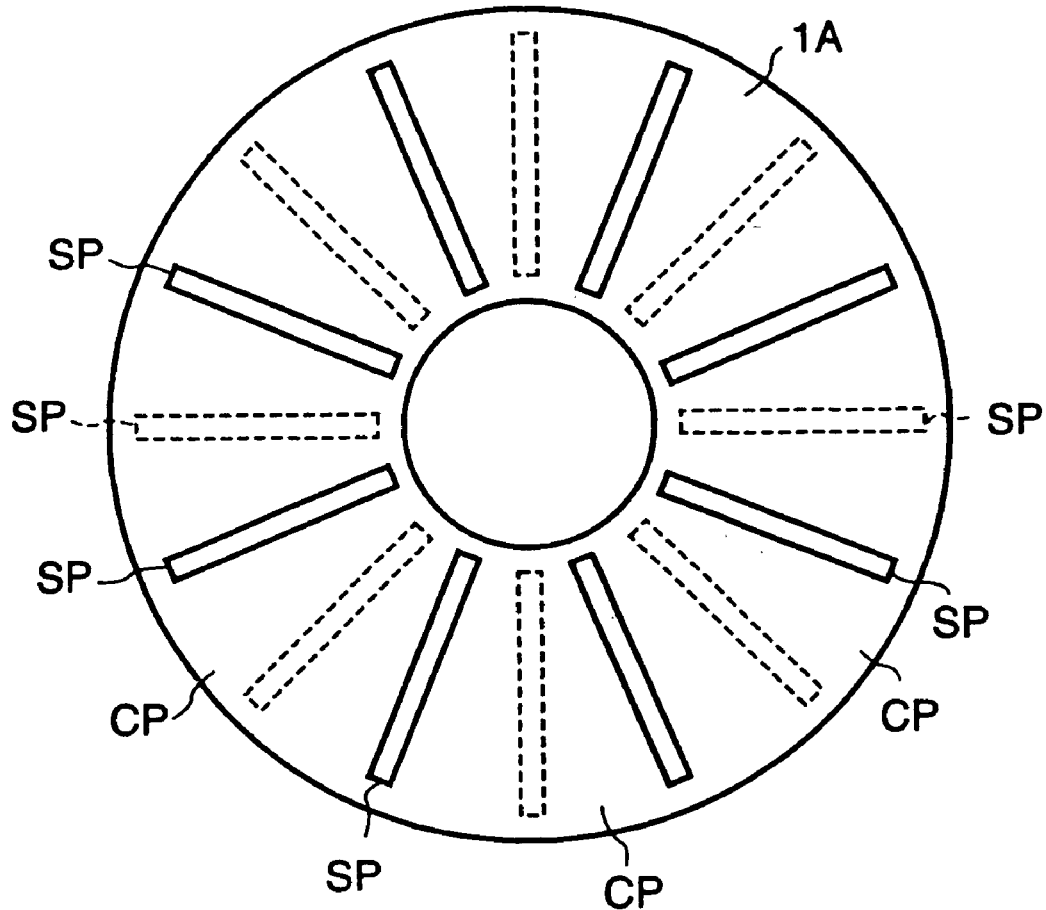
FIG. 10 is a diagram showing servo patterns and clock patterns used in an embodiment of magnetic disk apparatus consistent with the present invention.
Figure 11A:
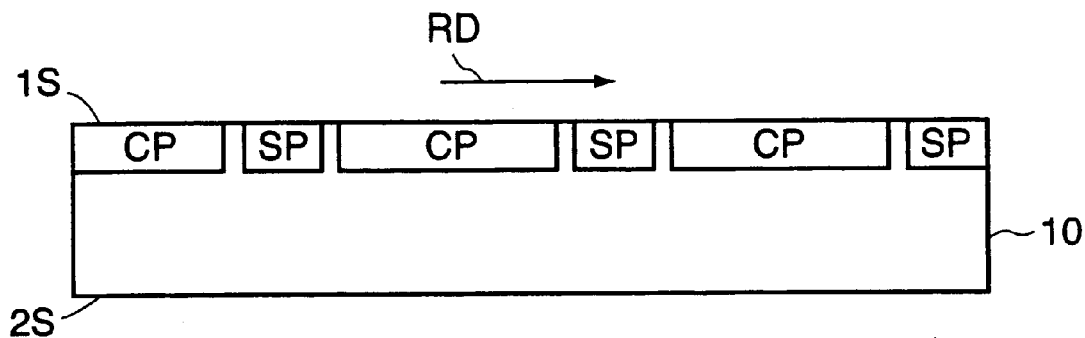
FIGS. 11A–11C explain servo write operations in an embodiment of magnetic disk apparatus consistent with the present invention.
Figure 11B:
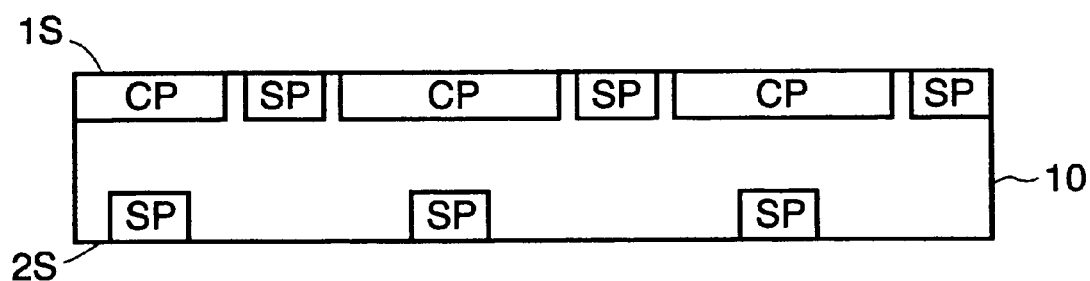
Figure 11C:
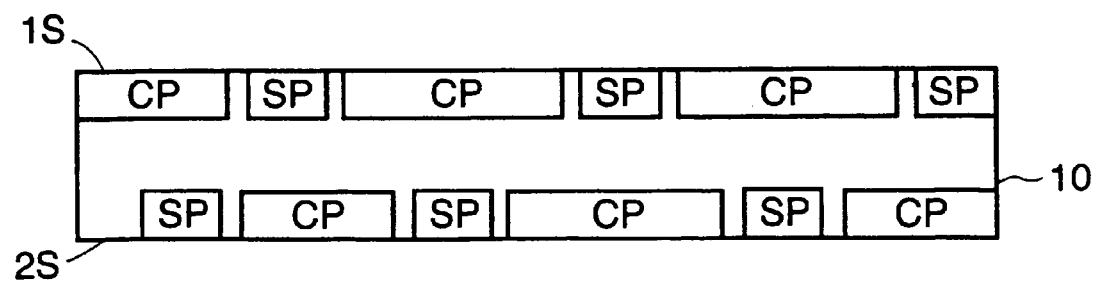
Figure 12:
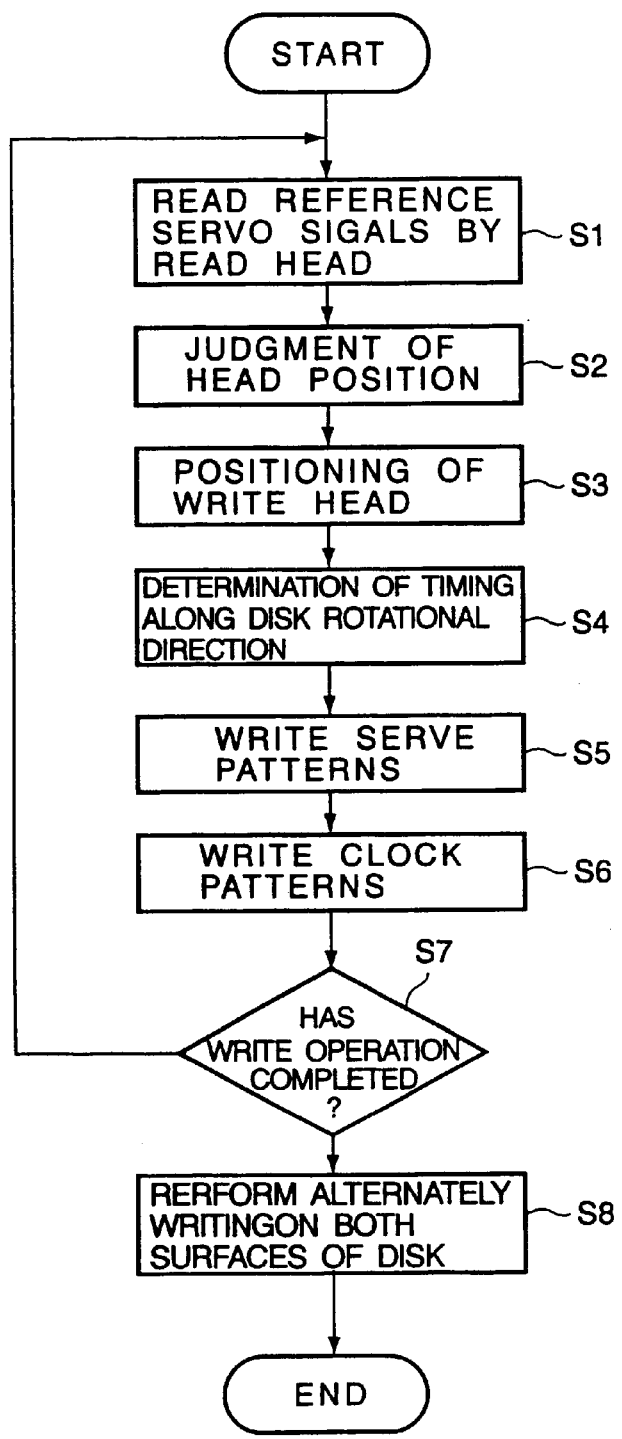
FIG. 12 is a flow chart explaining servo write operations in an embodiment of magnetic disk apparatus consistent with the present invention.

With reference to FIGS. 10–12, another embodiment consistent with the invention is explained. In this embodiment, as illustrated in FIG. 10, the disk 10 includes preliminarily recorded reference servo patterns (SP) and reference clock patterns (CP) on one surface of the disk 10. Here, as shown in FIGS. 11A–11C, reference servo patterns (SP) and reference clock patterns (CP) are alternately recorded on an upper surface 1S of the disk 10 in a rotational direction (RD) of the disk 10.

As shown in FIG. 12, a servo controller 72 reads out reference servo signals from the corresponding reference servo patterns (SP) through the first read head 1R (step S1). Based on the reproduced servo patterns from the read out reference servo signals, a head position of the first read head 1R is judged (step S2). Next, by using the position of the first read head 1R as a reference, the positioning control of the second write head 2W is carried out in a target position on the corresponding bottom surface 2S of the disk 10. In practical, as shown in FIG. 2, the second write head 2W is positioned by moving a rotary actuator in a ¼ pitch outer direction of the disk. Namely, as shown in FIG. 9, the servo controller 72 seeks a relative position relationship (RP1H, RP2H) between the second write head 2W on the bottom surface 2S and the upper surface 1S based on reference servo patterns (SP) read from the upper surface 1S of the disk 10. Then, the controller 72 controls positioning of the second write head 2W on a target position by calculating an error from the corresponding relative position relationship (RP1H, RP2H) (step S3).

On the other hand, the servo controller 72 determines accurate timing of the servo pattern writing position along the rotation direction (RD) of the disk 10 based on reference clock patterns (CP) read out by the first read head 1R (step S4). In accordance with the writing time, the servo controller 72 executes writing of reference servo patterns (SP) on a target position on the bottom surface 2S of the disk 10 by the second write head 2W (step S5). For pratical matters, as shown in FIG. 11B, the reference servo patterns (SP) are copied on the bottom surface 2S of the disk 10. In this case, the copied reference servo patterns (SP) are written in a counter position to the recorded reference clock patterns (CP) on the upper surface 1S.

Further, servo controller 72 writes in the reference clock patterns (CP) between servo patterns (SP) of the bottom surface 2S of the disk 10 by the second write head 2W (step S6). Thus, as shown in FIG. 11C, the reference clock patterns (CP) are copied on the bottom surface 2S of the disk 10. In this case, reference clock patterns (CP) are copied at the counter positions of the recorded reference servo patterns (SP) on the upper surface 1S.

When the reference servo patterns (SP) and reference clock patterns (CP) are copied on both surfaces of the disk 10 (step S7), the servo controller alternately performs writing the servo patterns (SP) and clock patterns (CP) on both surfaces of the disk 10 (step S8). Based on the reference servo patterns (SP) and reference clock patterns (CP) read by the second read head 2R, the servo patterns (SP) and clock patterns (CP) are written by the first write head 1W on the upper surface 1S of the disk 10. Moreover, the servo patterns (SP) and clock patterns (CP) are written on the bottom surface 2S by the second write head 2W, based on the reference servo patterns (SP) and reference clock patterns (CP) which are read by the first read head 1R. Newly written clock patterns (CP) are used to adjust timing in a bit unit between the already written servo patterns (SP) and the postscript servo patterns (SP). By using these clock patterns (CP), the write positions of the servo patterns (SP) and clock patterns (CP) along the rotation direction (RD) of the disk 10 are determined.

Accordingly, the embodiment of the self-servo writing method consistent with the invention becomes possible to write servo patterns (SP) on both surfaces of the disk 10 by the disk drive 100 itself, along with preliminarily writing reference servo patterns (SP) and reference clock patterns (CP) on several tens to hundreds tracks on one surface of the disk 10. The clock patterns (CP), including reference patterns, on the disk 10 are overwritten on the plurality of data sectors (user data) on the data tracks.

In the embodiment, preliminarily write reference servo patterns (SP) and reference clock patterns (CP) is done on several tens to hundreds tracks before performing self-servo writing operations. However, it takes only several ten seconds to minutes for writing on one surface per disk. Furthermore, according to the self-servo writing method of this embodiment, the servo patterns can be accurately written by each pair of head elements in the drive apparatus itself, since the positioning control of the write heads and setting-up of the writing time along the rotation direction are performed by using the preliminarily recorded reference servo patterns (SP) and reference clock patterns (CP) on the disk 10.

According to the embodiment, during the writing operation of servo patterns on the disk 10, an appropriate write position can be determined based on a relative position error of each pair of head elements and the disk surface. Thus the servo writing operation can be performed by the writing time along the disk rotation direction by using the magnetic head elements in the disk drive itself. Therefore, it becomes possible to determine a higher accuracy of the servo writing operation.

As explained above, the magnetic disk apparatus 100 and method for writing servo patterns are performed by alternately changing servo pattern reading operation and servo pattern writing operation on both surfaces of the disk based on the preliminarily written reference servo patterns. Thus, the postscript writing operation of servo patterns can be performed with a body cover attached on the magnetic disk apparatus 100 under a normal environment without using clean room environment.

Moreover, an extensive cost improvement is achieved by sharply reducing the number of special servo writer instruments since reference servo patterns 110 are written only on portions of the disk 10. Furthermore, it becomes possible to prevent inaccurate servo patterns due to accidental factors from writing on the disk 10 by permitting the servo pattern writing operations only when the relative error between the disk 10 and the first write head 1W enters in a preliminary set up limit. Thus, it is possible to perform postscript operations of accurate servo patterns only. Furthermore, there is no need for occupying special servo writer instruments for a long time and the postscript operations itself does not need to be carryied out within a clean room. Therefore, it becomes possible to reduce the manufacturing cost.

What is claimed is:

1. Magnetic disk drive apparatus, comprising:
   a disk medium having a first and a second surface, each including a plurality of recording tracks having a certain track width, and at least one of the first and second surfaces of the disk medium including a plurality of preliminarily recorded reference servo data;
   a first pair of head elements facing close to the first surface of the disk medium for writing a first servo data and/or reading the reference servo data;
   a second pair of head elements being located symmetrically to the first head element facing close to the second surface of the disk medium for writing a second servo data and/or reading the reference servo data;
   a head positioner for alternately determining a first and second head position for data writing on the respective surfaces by calculating a first relative position between the second head element and the second surface, based on the reference servo data or the second servo data read by the second head element, and by calculating a second relative position between the first head element and the first surface based on the reference servo data or the first servo data read by the first head element;
   a head mover for alternately carrying the first or second head element to the data writing position on respective surfaces of the disk medium determined by the head positioner; and
   a servo data writing controller for controlling the respective servo data writing on the respective data writing positions on the respective surfaces of the disk medium by the respective head element.

2. The magnetic disk drive apparatus of claim 1, wherein: the first pair of head elements includes a first write head for writing the first servo patterns, and a first read head for reading the reference servo patterns or the first servo patterns;
   the second pair of head elements includes a second write head for writing the second servo data, and a second read head for reading the reference servo data or the second servo data; and
   the head positioner alternately determines the data writing positions on the first and second surfaces of the disk medium by calculating a first relative position between the second read head and the second surface of the disk medium based on the reference servo data or the second servo data read by the second read head, and by calculating a second relative position between the first read head and the first surface of the disk medium based on the reference servo data or the first servo data read by the first read head.

3. The magnetic disk drive apparatus of claim 2, wherein:
   each of the first and second read heads is located at an inner position along a radius direction of the a distance disk from each of the first and second write heads by at least more than a track width during operation; and
   the head positioner successively determines the data writing position of the respective write heads at an outer position along the radius direction of the disk.

4. The magnetic disk drive apparatus of claim 2, wherein:
   each of the first and second read heads is located at an outer position along a radius direction of the disk a distance from each of the first and second write heads by at least more than a track width during operation; and
   the head positioner successively determines the data writing position of the respective write heads at an inner position along the radius direction of the disk.

5. The magnetic disk drive apparatus of claim 1, wherein;
   the servo data writing controller prohibits the servo data writing operation, by the first or second head element, when the first or second relative position calculated by the head positioner exceeds a predetermined value.

6. Magnetic disk drive apparatus, comprising:
   a disk medium including a first and a second data recording surface, at least one of the surfaces of the disk medium having a reference data area in which reference servo data for determining a writing position along a radius direction and reference clock patterns for determining a writing time along a rotational direction are preliminarily recorded;
   a first and a second pair of magnetic head elements for performing data read/write operations on respective surfaces of the disk medium; and
   a controller for controlling servo data writing operations in a predetermined area of the respective surfaces by using the reference servo data and the reference clock patterns read by the magnetic head elements facing the respective surfaces during a servo writing operation;
   wherein the controller includes a positioning controller for determining a writing position of the servo data along a radius direction of the disk medium by using the reference servo data, and a writing controller for determining a writing time of the servo data along a rotational direction of the disk medium by using the reference clock patterns.

7. The magnetic disk drive apparatus of claim 6, wherein:
   the first pair of magnetic head elements face the first surface of the disk medium and include a first read head and a first write head, and the second pair of magnetic head elements face the second surface of the disk medium and include a second read head and a second write head;

the positioning controller determines the writing position of the second write head by using the reference servo data read by the first read head and the writing time by using the reference clock patterns read by the first read head; and the writing controller performs a writing process of the reference servo data and the reference clock patterns on the second surface of the disk medium by the second write head.

8. The magnetic disk drive apparatus of claim 6, wherein:

the first pair of magnetic head elements face the first surface of the disk medium and include a first read head and a first write head, and the second pair of magnetic head elements face the second surface of the disk medium and include a second read head and a second write head;

the writing controller performs a copying process of the reference servo data and the reference clock patterns through the second write head by using the reference servo data and the reference clock patterns read by the first read head; and the writing controller performs the servo data writing operations on the first and second surfaces of the disk medium by alternately controlling the first write head and the second write head by using the reference servo data and the reference clock patterns recorded by the copying process.

9. The magnetic disk drive apparatus of claim 6, wherein:

the writing controller writes the servo data on a surface opposite the surface of the disk medium having a recorded area of the reference clock patterns.

10. The magnetic disk drive apparatus of claim 6, wherein:

each of the magnetic head elements includes a read head and a write head mounted on a slider; and the read head and the write head are located substantially parallel to each other along a radius direction of the disk so as to have a certain distance therebetween.

11. A method for writing servo data in a magnetic disk drive apparatus including a disk medium having a first and a second surface, each having a plurality of recording tracks and a plurality of preliminarily recorded reference servo data, wherein each of the recording tracks have a track width, a first pair of head elements facing close to the first surface of the disk medium for writing servo data and reading the reference servo data, and a second pair of head elements being located symmetrically to the first head element of the disk medium so as to closely face to the second surface of the disk medium for writing servo data and reading the reference servo data, the method comprising:

writing a first servo data on the first surface of the disk medium with the first head element;

reading the reference servo data or the first written servo data with the first head element;

writing a second servo data on the second surface of the disk medium with the second head element;

reading the reference servo data or the second written servo data with the second head element;

calculating a first relative position between the second head element and the second surface of the disk medium based on the reference servo data or the second servo data read by the second head element;

determining the first head position for data writing on the first surface of the disk medium;

calculating a second relative position between the first head element and the first surface of the disk medium based on the reference servo data or the first servo data read by the first head element;

determining the second head position for data writing on the second surface; and alternately carrying the first or second head element to the determined data writing position on the respective surfaces of the disk medium.

12. The method for writing servo data of claim 11, further including:

prohibiting the servo data writing operation by the first and second head elements if the calculated relative position exceeds a predetermined value.

13. A method for writing servo data in a magnetic disk drive apparatus including a disk medium having a first and a second data recording surface, each surface having a reference data area in which reference servo data for determining a writing position along a radius direction and reference clock patterns for determining a writing time along a rotational direction are preliminarily recorded and a first and a second pair of magnetic head elements for performing data read/write operations on the respective surfaces of the disk medium; the method comprising:

reading the reference servo data and the reference clock patterns with a first read head facing the first surface of the disk medium;

determining a writing position on the second surface of the disk medium by using the reference servo data read by the first read head;

determining a writing time of a second write head by using the reference clock patterns read by the first read head; and writing the reference servo data and the reference clock patterns on the second surface of the disk medium with the second write head.

14. The method for writing servo data of claim 13, further comprising:

alternately writing the servo data on the first and second surfaces of the disk medium with the first and second write heads, respectively, by using the reference servo data and the reference clock patterns.

15. The method for writing servo data of claim 13, wherein:

the writing of the servo data is performed on a surface opposite the surface having a recorded area of the reference clock patterns.

16. The method for writing servo data of claim 13, wherein:

the writing of the servo data on the second surface of the disk medium is performed by using the reference servo data and the reference clock patterns read by the first read head; and the writing of the servo data on the first surface of the disk medium is performed by using the reference servo data and the reference clock patterns read by the second read head.

* * * * *